A. MAZUREK.
ANIMAL TRAP.
APPLICATION FILED APR. 2, 1917.
1,243,088.
Patented Oct. 16, 1917.
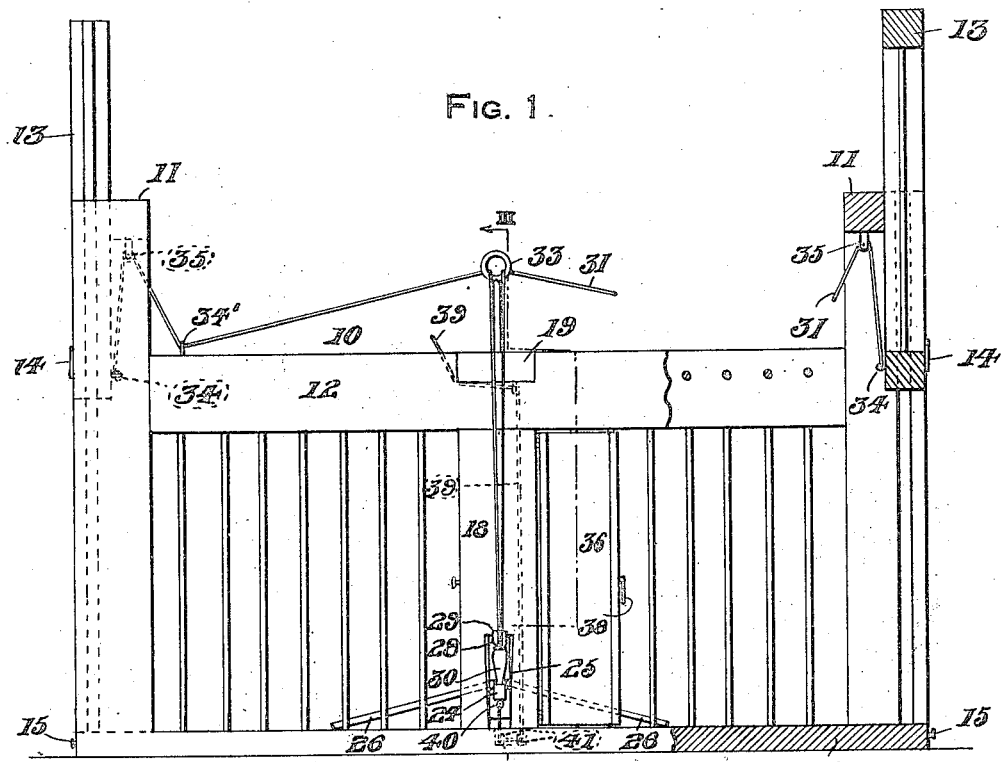
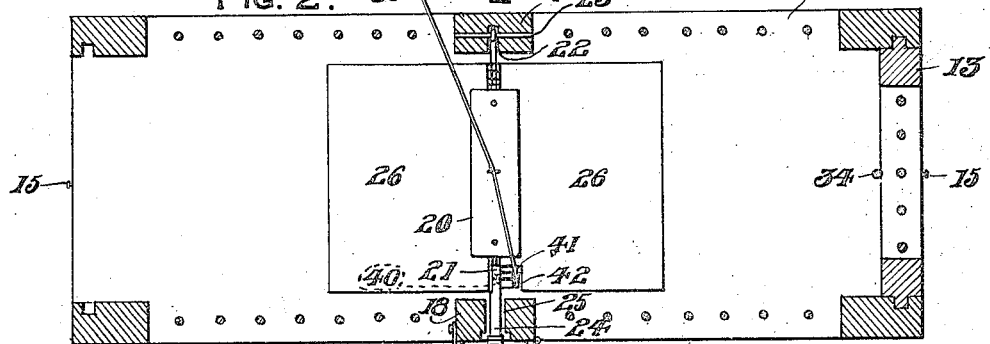
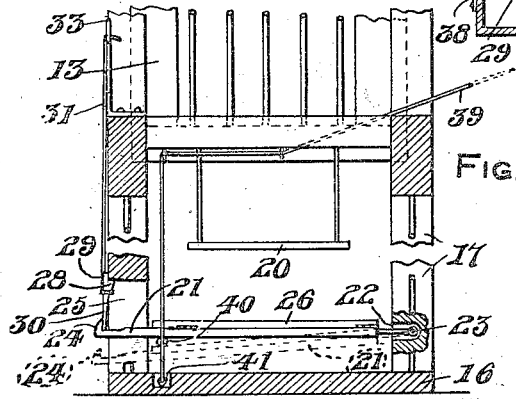
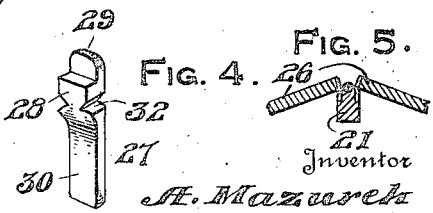
Inventor
A. Mazurek
By N. W. Wilson
Attorney ated Oct. 16, 1917.
UNITED STATES PATENT OFFICE.

ANTONI MAZUREK, OF DETROIT, MICHIGAN.

ANIMAL-TRAP.

1,243,088.

Specification of Letters Patent.   Patented Oct. 16, 1917.

Application filed April 2, 1917.   Serial No. 159,284.

*To all whom it may concern:*

Be it known that I, ANTONI MAZUREK, a citizen of Russia, residing at Detroit, in the county of Wayne and State of Michigan, have invented certain new and useful Improvements in Animal-Traps, of which the following is a specification.

This invention relates to certain new and useful improvements in animal traps.

The primary object of the invention is the provision of a trap adapted for catching animals such as rabbits, squirrels, rats or even larger animals in the live state, provision being made for preventing any tampering with the tripping mechanism from a point exteriorly of the trap.

A further object of the device is to provide a trap for capturing animals arranged with a conveniently positioned setting mechanism exteriorly of the trap arranged with suitable inclosing guard means rendering the accidental springing of the trap means impossible.

In the drawing forming a part of this application and in which like designating characters refer to corresponding parts throughout the several views, Figure 1 is a side elevation of the device partially broken away illustrating the same in its said arrangement with the mechanism guard open.

Fig. 2 is a horizontal longitudinal sectional view thereof with one of the end gates and guard in their closed positions.

Fig. 3 is a detail sectional view taken upon line III—III of Fig. 1.

Fig. 4 is a perspective view of the trip pin, and,

Fig. 5 is a detail sectional view of the central portion of the tripping platform.

Referring more in detail to the drawing, an elongated cage 10 is arranged having a rectangular end or door frames 11 projecting above the top 12 of the cage and arranged with gates 13 vertically slidable within the said frames adapted for retention in their lowered closed positions by means of a hook 14 carried by each gate adapted to engage over a nail 15 at the adjacent end of the cage bottom 16.

Opposite side posts 17 and 18 are arranged upright substantially centrally of the cage 10 while a centrally transverse beam 19 is positioned thereabove forming a part of the cage top 12 and having a bait carrier or receiving shelf 20 arranged within the cage suspended therefrom. A tripping platform is positioned within the cage consisting of a central stringer 21 arranged transversely of the cage with one end of the stringer pivoted with a recess 22 adjacent the bottom of the post 17 by means of a metal extension 23, while the opposite end of the stringer 21 is arranged in the form of a hook 24 vertically shiftably arranged through a slot 25 in the opposite post 18. Platform members or boards 26 are hinged to the opposite sides of the stringer 21 upon which any animal may readily walk after entering the cage 10 through one of the end casings 11 thereof.

A trip pin 27 is arranged having a head 28 provided with a notch 29 the resultant shoulder of which is adapted to seat over the upper end wall of the slot 25 when the lower tapered end 30 of the pin 27 is engaged with the hook 24 as best illustrated in Fig. 3 of the drawing, it being understood that elevating cords 31 are secured to the neck portion 32 of the trip pin and pass upwardly through a bracket 33 upon the beam 19 and thence to the gate 13 and being secured to the latter as at 34. The cords 31 are arranged between eyes 34' upon the cage top 12 and other pulleys 35 at the upper ends of the casings 11 intermediate from points of contact with the bracket 33 and gate connections 34 whereby the gates 13 are maintained elevated when the pin 27 is in its lowered position while the said gates readily fall to their closed positions when the cords 31 are slackened by the releasing of the pin 27.

A mechanism guard 36 is provided for normally overlying the hook 24 and pin 27 to the adjacent slot 25 and the adjacent portions of the cords 31, the said guard being U-shaped in cross-section and hinged to the post 18 at one side thereof as at 37 while a securing latch is provided at its opposite side for maintaining the housing closed, and closing the said mechanism therein when the mechanism is in its set arrangement. It will be understood that when the trap is in its set position as best illustrated in Figs. 1 and 3 of the drawing, an animal may freely enter the cage 10 through the end frames 11 thereof for procuring the bait not shown arranged upon the shelf 20 and upon traveling upon the platform 26, the stringer 21 is depressed by the weight of the animal and disconnecting the hook 24 from the trip end 30, thereby releasing the trip 27 and permitting the weight of the gates 13 to allow the latter to fall to their closed positions, the closing of the gates 13 is simultaneous and it will be noted that the housing 36 when closed offers no obstruction to the operation of the trap.

A springing cable 39 is provided, whereby the trap may be sprung by an operator positioned at a distance from the cage whenever desired, the said cable 39 being connected to the bottom of the stringer 21 as at 40 thence passing through a staple 41 carried by the bottom of the cage and thence upwardly through a notch 42 in one of the boards 26 and then passing in any convenient manner through the top 12 to the cage to a desirable distant point.

An animal trap is arranged possessing great strength which may be set for easy actuation either automatically by an animal entering the trap or by a person located at a distance therefrom while the setting mechanism is conveniently positioned exteriorly of the trap and fully protected when in a set position.

What I claim as new is:—

An animal trap, including a cage having end closure frames, vertically movable closures positioned within said frames, sideposts for said cage, a stringer pivoted at one end within a recess in one of said posts and having a hook-terminal vertically shiftable in a slot in the other side-post, tripping platforms hinged to opposite sides of said stringer, said hook-terminal projecting outwardly of said cage, a notched headed trippin adapted for coöperation with said hook-terminal, said notched head having a shoulder seated over the upper end wall of said slot when the lower end of said trip-pin is engaged with said hook-terminal, flexible connections between said end-frame closures and said trip-pin, and guarding means hinged to one of said posts for said hook-terminal and said trip-pin and a retaining latch for said guarding means.

In testimony whereof I affix my signature.

ANTONI MAZUREK.